No. 796,064. PATENTED AUG. 1, 1905.
T. DUNCAN.
AUTOMATIC SWITCH FOR STORAGE BATTERIES.
APPLICATION FILED JAN. 8, 1902. RENEWED JAN. 7, 1905.
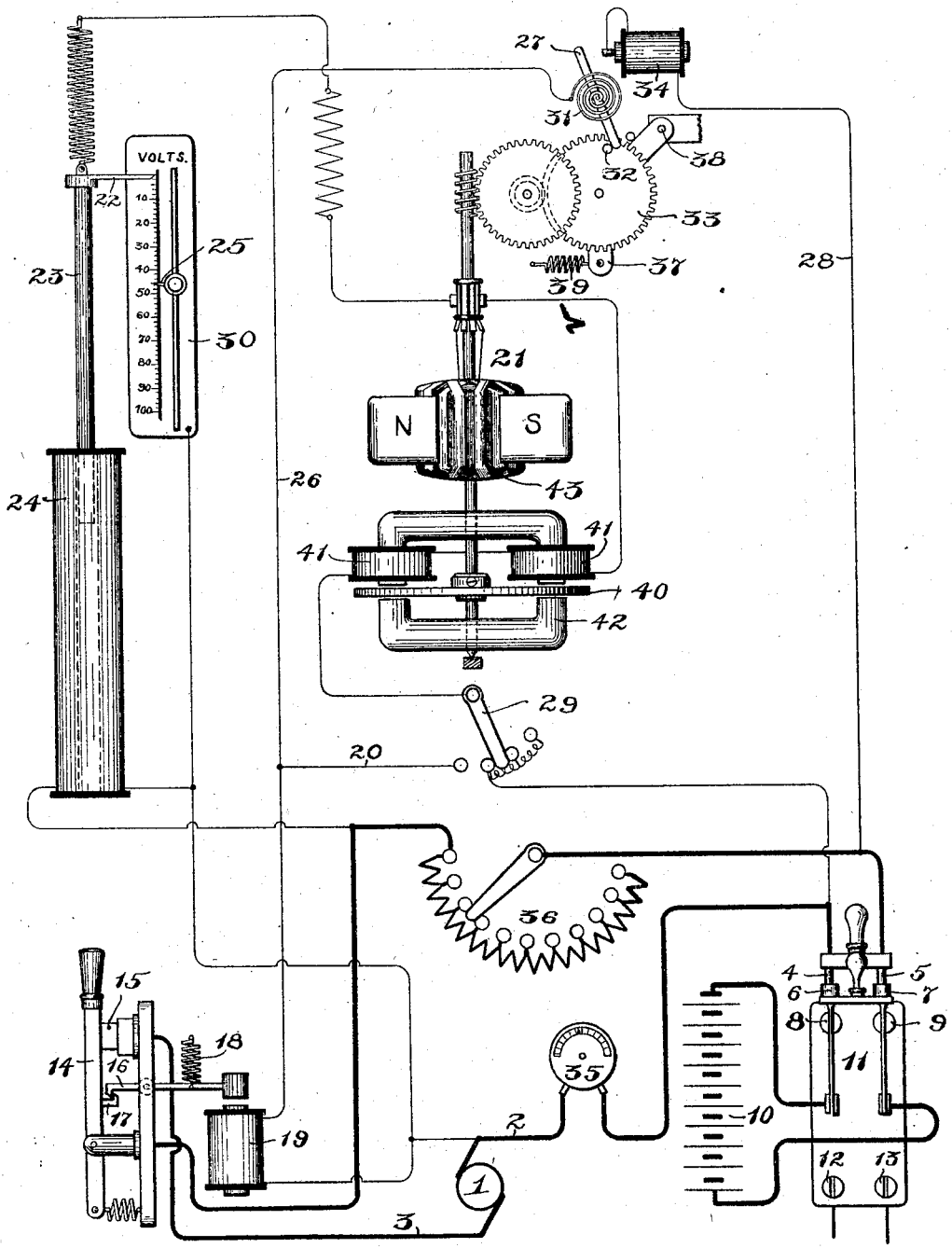
Witnesses:
Lynn A. Williams
Max A. Label
Inventor:
Thomas Duncan,
By Charles A. Brown Gregg & Belfield
Attorneys.

UNITED STATES PATENT OFFICE.

THOMAS DUNCAN, OF LAFAYETTE, INDIANA.

AUTOMATIC SWITCH FOR STORAGE BATTERIES.

No. 796,064.      Specification of Letters Patent.      Patented Aug. 1, 1905.

Application filed January 8, 1902. Renewed January 7, 1905. Serial No. 239,984.

*To all whom it may concern:*

Be it known that I, THOMAS DUNCAN, a citizen of the United States, residing at Lafayette, in the county of Tippecanoe and State of Indiana, have invented a certain new and useful Improvement in Storage Batteries, (Case No. 52,) of which the following is a full, clear, concise, and exact description, reference being had to the accompanying drawing, forming a part of this specification.

My invention relates to storage batteries, and particularly to an improved means for automatically cutting the storage battery out of circuit with the charging source of current when the battery has been sufficiently charged.

The invention has for its object, first, the provision of automatically-operated means for cutting the battery out of circuit; second, the provision of means for adjusting the operation of the cut-out mechanism to batteries of different capacities, and, third, the provision of means whereby the cut-out mechanism will not be operated upon a momentary full pressure of the battery secured before the battery has been fully charged.

At the present time in charging storage batteries it is the practice to connect them to a source of current and charge them until their electromotive force rises to a selected quantity, after which they are cut out of circuit by manually-operated switches, which require the constant attendance of one or more employees, according to the number of batteries that are in service.

By my present invention means are provided whereby the pressure of the battery when charged causes the operation of a "potential-switch," which may be in the form of a potential-indicator having a contact set at a predetermined pressure and which serves when this pressure is reached to effect disconnection. The potential-switch is provided with a motor member having a pressure-winding connected across the charging-mains. The motor is preferably in the form of a solenoid, the core of the solenoid carrying one terminal of the switch, the other terminal being adjustable to correspond with the selected pressure at which the circuit including the storage battery is to be opened. This pressure-motor preferably works in coöperation with the potential-switch governed thereby, the contacts of the switch constituting terminals of a releasing-magnet that effects the separation between the storage battery and its charging-circuit. I do not wish to be limited, however, in all embodiments of the invention to the precise agency acting in coöperation with the potential-motor for effecting a separation between the storage battery and the charging-circuit.

As is well known to those skilled in the art, the potential of the charging-circuit may under certain conditions fluctuate during the time of charge, and in order to prevent the potential-motor from effecting a premature separation between the storage battery and its charging-circuit upon the occasion of a fluctuation in the pressure that equals the predetermined pressure of the battery I employ a retarding agency that directly controls the release of the switch, but which requires a certain period of operation—say five minutes—before it will effect the release of this switch, so that the switch cannot be released during the continuance of a momentary fluctuation in the pressure. The retarding agency is preferably in the form of a rotating motor, which may well be the motor of a voltmeter, which motor is preferably provided for the purpose with a train, one of the wheels whereof is equipped with a pin that operates a switch, which switch in turn may control the circuit including the releasing-magnet. An adjusting step-by-step resistance is included in circuit with the pressure-motor to vary the speed of its operation in accordance with the time that is to be allowed for insuring the completion of the charge. The releasing electromagnet is preferably associated with means whereby it may be directly controlled by the solenoid-motor independently of the rotating motor or directly by the rotating motor acting in combination with the solenoid-motor.

I will explain my invention more fully by reference to the accompanying drawing, illustrating the preferred embodiment thereof, the circuit connections of the charging-circuit and the storage battery being indicated in connection with my improved apparatus.

In the drawing I have illustrated a mechanically-operated generator 1 in circuit with transmission-mains 2 3, that terminate in plugs 4 and 5, that may make connection with sockets 6 and 7 in electrical connection with the switch-contacts 8 and 9. The storage battery 10 has its terminals in the blades of a knife-switch 11, that are adapted for contact with the terminals 8 and 9 of the charging-circuit or the terminals 12 and 13 of the consumption-circuit to be supplied with energy from the storage battery. A circuit-opening switch has its blade 14 and its contact 15 included in the main conductor 3. A detent 16 engages a catch 17, provided upon the blade to normally hold the blade in closed circuit, a spring 18 acting yieldingly to maintain this engagement. The detent is controlled by an electromagnet 19, whose armature may when attracted actuate the detent to release the blade 14, the armature for the purpose being preferably directly mounted upon the detent-lever. The winding of magnet 19 is connected in bridge of the mains 2 and 3, this bridge including either the branch conductor 20, the rotating pressure-motor 21, the movable contact 22, carried by the core 23 of the solenoid 24, the adjustable contact 25 when in engagement with the contact 22, or the branch conductor 26, the switch 27, and the conductor 28, according to the position of the switch 29.

When the switch 29 is adjusted to include the magnet 19 in the bridge containing the conductor 20, although the motor 21 is included in circuit, it is not included for any particular purpose, but merely constitutes a part of the bridge thus established, the apparatus in this adjustment being designed to immediately cut out the charging-machine from the storage battery when the contacts 22 and 25 are in engagement. When the switch 29, however, is adjusted to include the branches 26 and 28 in circuit, circuit through the magnet 19 cannot be closed until the switch 27 has been operated by the motor 21 to effect this closure. Assuming that the switch 29 is adjusted to include the conductor 20 in circuit, when the potential of the battery 10 is raised to the predetermined point the winding of the solenoid 24 will attract the solenoid-core until the contact 22, carried by the core, will engage the contact 25, that has been adjusted to this predetermined potential. The contact 25 is adjustable longitudinally of a scale 30, marked off with various potentials for effecting adjustment according to the different batteries. With this adjustment of the batteries the moment the predetermined potential has been indicated by the index-contact 22 the magnet 19 is energized, the detent-lever 16 is disengaged from the blade 14, and the said blade is released from its contact 15, thereby opening the circuit including the charging-machine 1. If, however, there should be a tendency to sudden fluctuations of potential, the switch 29 is adjusted to include the normally disconnected conductors 26 and 28, in circuit with the magnet 19, these conductors being connected by the switch 27 when the motor 21 has been operated a predetermined length of time.

The switch 27 is preferably centrally pivoted, having a coiled spring 31 for normally maintaining a disconnection between the conductors 26 and 28, which coiled spring is opposed by a pin 32, carried upon a wheel 33 of the train moved by the motor 21. The wheel 33 moves in a clockwise direction, so that when the pin 32 has consumed the predetermined time in effecting the revolution it comes into engagement with the switch 27 and moves the same away from the contact of the said switch, the spring 31 upon the disengagement between the said switch and pin momentarily completing connection between the conductors 26 and 28 to effect the energization of magnet 19 and the release of the switch-blade 14.

The contact engaged by the lever-switch 27 is preferably arranged within the field of a magnet 34, included in the conductor 28, so that a magnetic blow-out may be established for disrupting the arcs. The switch 29 is preferably associated with a rheostat divided into a plurality of sections, so that the speed of the motor 21 may be adjusted according to the time it is to operate before the switch 14 is opened.

There is included in the charging-circuit an ammeter 35 and a series resistance 36 for the purpose of regulating the volume of current that is being passed into the battery.

In order that the train may be adjusted independently of the operation of the motor 21, as in resetting the train after the motor has once fully operated the same, the wheel 33 may be mounted upon a lever 37, pivoted at 38 and carrying the mounting of the wheel 33, a spring 39 yieldingly maintaining the wheel 33 in engagement with the balance of the train.

It is preferable that the speed of the motor 21 be constant for any pressure to which the adjustable contact 25 is set. To this end I employ an armature 40, inductively arranged within the field produced by the coils 41 and the iron cord or keeper 42, so that the strength of the magnetic field will vary directly as the current through the armature 43 of the motor, whereby the desired constancy of speed with varying pressures is secured. The armature 43 and the winding 41 are preferably included in series and together included in bridge of the transmission-mains. The core portion 42 may be adjustable toward or from the disk to control the speed of the motor 21 aside from the adjustment effected by the switch-arm 29. Other means may be employed for controlling the speed of this motor, if desired. The core 23 of the solenoid is preferably made to fit the bore of the solenoid snugly, while the bottom of the bore is closed to form an air dash-pot.

The expression "pressure-motor" herein relates to the primary agency 24, that effects supreme control over the electromagnet 19, The secondary electric motor is styled the "rotating" pressure-motor 21 or "retarding agency." I do not wish to be limited to the forms that these motors take. In the claims that follow the term "pressure-motor" is used in the sense of prime agency for effecting the control of the circuit-braking switch.

It is obvious that changes may readily be made from the precise embodiment of my invention herein set forth without departing from its spirit, and I do not, therefore, wish to be limited to the precise arrangement set forth; but,

Having thus described my invention, I claim as new and desire to secure by Letters Patent—

1. The combination with a storage battery, of a charging-circuit for connection therewith, a switch for effecting disconnection between the storage battery and the charging source of current, motor means subject to the pressure and operating when the storage-battery pressure has reached a predetermined limit to operate the switch to disconnect the storage battery from the charging-circuit, and a retarding agency coöperating with the said motor means in effecting a disconnection of the storage battery but preventing premature disconnection, substantially as described.

2. The combination with a storage battery, of a charging-circuit for connection therewith, a switch for opening the charging-circuit, an electromagnet for causing the switch to open, a pressure-motor for effecting the operation of the electromagnet, and a retarding agency coöperating with the said motor in effecting a disconnection of the storage battery but preventing premature disconnection, substantially as described.

3. The combination with a storage battery, of a charging-circuit for connection therewith, a switch for opening the charging-circuit, an electromagnet for causing the switch to open, a pressure-motor for effecting the operation of the electromagnet, and a switch including the said electromagnet closed by the said motor upon the attainment of predetermined pressure, one of the contacts of the said switch being carried by the motor, the said contacts being relatively adjustable whereby the apparatus may be adjusted to effect disconnection of the storage battery with the charging-circuit at differing predetermined pressures, substantially as described.

4. The combination with a storage battery, of a charging-circuit for connection therewith, a switch for opening the charging-circuit, an electromagnet for causing the switch to open, a pressure-motor for effecting the operation of the electromagnet, a second motor brought into action by the aforesaid motor, and a switch governed by the second motor for closing circuit through the said electromagnet to effect disconnection between the storage battery and the charging-circuit, substantially as described.

5. The combination with a storage battery, of a charging-circuit for connection therewith, a switch for opening the charging-circuit, a pressure-motor, a second motor brought into action by the pressure-motor when a predetermined pressure has been attained, and means governed by the second motor for effecting the operation of the switch to disconnect the storage battery from the charging source of current, the second motor serving to retard the time of disconnection between the storage battery and the supply-circuit, substantially as described.

6. The combination with a storage battery, of a charging-circuit for connection therewith, a switch for effecting disconnection between the charging-circuit and the storage battery, a potential motor, a second electric motor, a switch governed by the potential motor for closing circuit through the second motor, and means controlled by the second motor for effecting the operation of the first aforesaid switch to disconnect the storage battery from the charging-circuit, substantially as described.

7. The combination with a storage battery, of a charging-circuit for connection therewith, a switch for effecting disconnection between the charging-circuit and the storage battery, a potential motor, a second electric motor, a switch governed by the potential motor for closing circuit through the second motor, means controlled by the second motor for effecting the operation of the first aforesaid switch to disconnect the storage battery from the charging-circuit, and means for varying the rate of speed of the second motor to adjust the delay in disconnection between the storage battery and the charging-circuit, substantially as described.

8. The combination with a storage battery, of a charging-circuit for connection therewith, a switch for effecting disconnection between the charging-circuit and the storage battery, a potential motor, a second electric motor, a switch governed by the potential motor for closing circuit through the second motor, and means controlled by the second motor for effecting the operation of the first aforesaid switch to disconnect the storage battery from the charging-circuit, the second motor being provided with an armature and a braking electromagnet, both subject to the pressure, substantially as described.

9. The combination with a storage battery, of a charging-circuit for connection therewith, a switch for effecting disconnection between the charging-circuit and the storage battery, a potential motor, a second electric motor, a switch governed by the potential motor for closing circuit through the second motor, means controlled by the second motor for effecting the operation of the first aforesaid switch to disconnect the storage battery from the charging-circuit, and an adjusting rheostat for varying the rate of operation of the second motor to adjust the delay in disconnection between the storage battery and the charging-circuit, substantially as described.

10. The combination with a storage battery of a charging - circuit for connection therewith, a switch for opening the charging-circuit, an electromagnet for causing the switch to open, electromagnetic means responsive to predetermined pressure for effecting the operation of the electromagnet, a switch operatively associated with the electromagnet, and a retarding agency for effecting the operation of the said switch, substantially as described.

11. The combination with a storage battery of a charging - circuit for connection therewith, a switch for opening the charging-circuit, an electromagnet for causing the switch to open, electromagnetic means responsive to predetermined pressure for effecting the operation of the electromagnet, a switch operatively associated with the electromagnet, a retarding agency for effecting the operation of the said switch and means whereby said retarding agency is governed in its operation by said electromagnetic means, substantially as described.

In witness whereof I hereunto subscribe my name this 20th day of November, A. D. 1901.

THOMAS DUNCAN.

Witnesses:
SAMUEL R. BACHTEL,
FRANK V. NELSON.